United States Patent [19]

Haninger

[11] Patent Number: 5,893,690
[45] Date of Patent: Apr. 13, 1999

[54] MACHINE TOOL WITH ROLLER-SHADE ENCLOSURE

[75] Inventor: Rudolf Haninger, Seitingen, Germany

[73] Assignee: Chiron-Werke GmbH & Co. KG, Tuttlingen, Germany

[21] Appl. No.: 08/839,122

[22] Filed: Apr. 23, 1997

[30] Foreign Application Priority Data

Apr. 25, 1996 [DE] Germany ............... 196 16 433

[51] Int. Cl.[6] ........................................ B23C 9/00
[52] U.S. Cl. .................... 409/134; 160/120; 409/202; 409/235
[58] Field of Search .................... 409/134, 202, 409/212, 235; 160/27, 28, 99, 100, 120

[56] References Cited

U.S. PATENT DOCUMENTS

| | | | |
|---|---|---|---|
| 2,311,413 | 2/1943 | Persson | 160/262 |
| 3,155,146 | 11/1964 | Malouf | 160/27 |
| 3,687,111 | 8/1972 | Epper | 119/2 |
| 3,803,943 | 4/1974 | Woloszyk | 74/612 |
| 3,911,990 | 10/1975 | Hoover et al. | 160/28 |
| 4,249,282 | 2/1981 | Little | 16/32 |
| 4,369,822 | 1/1983 | Rice | 144/286 R |
| 4,705,187 | 11/1987 | Linn . | |
| 4,999,895 | 3/1991 | Hirose et al. | 409/134 |
| 5,342,275 | 8/1994 | Yanase et al. | 409/134 |
| 5,439,431 | 8/1995 | Hessbruggen et al. | 409/134 |
| 5,449,256 | 9/1995 | Sundman | 409/134 |
| 5,479,840 | 1/1996 | Hilliard et al. . | |
| 5,611,137 | 3/1997 | Braun . | |
| 5,669,867 | 9/1997 | Hoppe | 409/235 |
| 5,690,205 | 11/1997 | Doherty | 160/120 |

FOREIGN PATENT DOCUMENTS

| | | |
|---|---|---|
| 0 194 173 A2 | 9/1986 | European Pat. Off. . |
| 0 712 683 A2 | 5/1996 | European Pat. Off. . |
| 29 46 825 A1 | 5/1981 | Germany . |
| 209 138 | 4/1984 | Germany . |
| 33 17 554 A1 | 11/1984 | Germany . |

*Primary Examiner*—Andrea L. Pitts
*Assistant Examiner*—Christopher Kirkman
*Attorney, Agent, or Firm*—Cummings & Lockwood

[57] ABSTRACT

A machine tool comprises a workpiece table which has a clamping surface for workpieces to be machined and a spindle head displaceable in a working space above the workpiece table relative thereto by means of a shifting mechanism and having a spindle receiving tools for machining the workpieces. The shifting mechanism comprises three carriages movable orthogonally to one another, of which the second carriage is mounted displaceably on the first, and the third carriage displaceably on the second carriage, the spindle head being joined to the third carriage. The first carriage is arranged behind the working space and above the clamping surface, preferably above the working space.

9 Claims, 4 Drawing Sheets

1

MACHINE TOOL WITH ROLLER-SHADE ENCLOSURE

BACKGROUND OF THE INVENTION

1. Field of the Invention

The present invention relates to a machine tool having a workpiece table which has a clamping surface for workpieces to be machined; a spindle head displaceable in a working space above the workpiece table relative thereto by means of a shifting mechanism and having a spindle receiving tools for machining the workpieces; and three carriages movable orthogonally to one another in the shifting mechanism, of which the second carriage is mounted displaceably on the first, and the third carriage displaceably on the second carriage, the spindle head being joined to the third carriage.

2. Related Prior Art

A machine tool of this kind is known from the related art.

In the case of the known machine tool, the spindle head is displaceable in three mutually orthogonal coordinate directions, specifically the X, Y, and Z directions, in a working space above the workpiece table.

The shifting mechanism provided for this purpose comprises as the first carriage an X carriage which is arranged in the region of the clamping surface of the workpiece table, preferably below the clamping surface. Arranged on this X carriage as the second carriage is the Y carriage, which is displaceable perpendicular to the X carriage so that the X and Y carriages enclose a plane which lies parallel to the clamping plane.

Arranged on the Y carriage is an upright which extends over the entire height of the working space and bears at its upper end the third carriage, i.e. the Z carriage, to which the spindle head is attached and thus projects from above into the working space. In other words, the upright extends on the rear wall (as viewed from the operator side) of the working space.

Depending on the height of the working space, the upright has a relatively large mass, so that kinematic limits are imposed on the maximum acceleration achievable upon displacement of the spindle head in the X or Y direction. Acceleration and deceleration of the upright cannot be attained in arbitrarily short time spans.

The known machine tool further has an enclosure which not only covers the machine tool externally but also provides a lining for the working space, so as to protect the shifting mechanism from chips as well as cutting and cooling oil. The carriages and guide rails as well as the upright are protected, in this context, by telescoping covers which constitute what may be called variable-length covers, so that the parts of the machine tool projecting from the shifting mechanism into the working space do not need to pass through slits in the enclosure, through which chips and cooling or cutting fluid might get into the shifting mechanism.

The telescoping covers comprise U-shaped sheet-metal elements which can slide over one another and are, for example, arranged on both sides of the X carriage and overlap the guides for said carriage and thus protect them from soiling.

All in all, large surfaces must be sealed in the case of the known machine tool, and the variable-length telescoping covers are provided for them.

One disadvantage with the telescoping covers is their large mass, which results not only from their design but also from the large surfaces to be sealed, so that the telescoping covers also contribute to the acceleration problems already mentioned above. A further disadvantage is that the sheet-metal parts strike one another when being slid together or moved apart, especially at high displacement velocities. These impacts not only represent a noise problem, but also impair the machining accuracy of the known machine tool due to the vibrations associated with them.

SUMMARY OF THE INVENTION

In view of the above, it is an object of the present invention to improve the machine tool mentioned at the outset in such a way that with a physically simple design and while achieving good sealing of the working space with respect to the shifting mechanism in particular, more rapid displacement of the spindle head becomes possible.

In the case of the machine tool mentioned at the outset, this object is achieved by the fact that the first carriage is arranged behind the working space and above the clamping surface, preferably above the working space.

The object underlying the invention is completely achieved in this manner.

Specifically, the inventors of this application have recognized that by elevating the X carriage and thus also the Y carriage, it is possible to attain a generally compact arrangement in which the upright needs to have much less height than was the case with the related art. Also associated with the lesser height of the upright, however, is a much smaller mass, so that greater accelerations are possible in the case of the new machine tool.

A further advantage of this completely new design lies in the separation between the shifting mechanism on the one hand and the working space on the other hand. The entire shifting mechanism can be installed above and behind the working space, so that the spindle can project, in front of and beneath the X carriage, into the working space from above. This design makes it possible, however, to seal most of the working space using fixed covers, so that essentially only the upper region of the working space has to be protected using variable-length covers. This means, however, that the mass of the moving covers is also much less, which further contributes to the fact that much greater accelerations and velocities can be used in the case of the new machine tool when displacing the spindle head.

In an embodiment, it is preferred if a roller-shade cover, which winds up and unwinds upon displacement of the first carriage and covers the working space with its roller-shade surface, is arranged on both sides of the first carriage. The advantage here is that with a very simple design, a variable-length cover with very low weight is used, thus further reducing the moving mass, which has an advantageous effect on the acceleration behavior of the spindle head. In known machine tools, the variable-length covers had to be arranged in the region of the clamping surface, i.e. exactly where machining of the workpieces occurs and where a large number of chips therefore occur, some of which are thrown off from the workpiece or the tool with great velocity and momentum. In order to withstand these stresses, the known covers had to be mechanically very stable.

In the case of the new design, in which a cover for the working space is essentially required only toward the top, much reduced demands are to be placed on the mechanical strength of the variable-length covers, since both the number and the velocity of the chips arriving in this region of the working space are much less than is the case in the region of the clamping surface.

The new design with the elevated X carriage, on which the Y carriage then of course also sits, thus allows the use of much lighter and simpler variable-length covers, for example roller-shade covers. This feature not only reduces the costs of the new machine tool, but because of the much lower weight as compared with the related art, it also allows more rapid displacement of the spindle head.

In an embodiment, it is preferred if a cheekpiece extending to the upper end of the working space, on which the respective associated roller-shade cover is attached with its free end, is arranged on both sides of the first carriage, whereby the respective roller-shade cover is wound onto a roller arranged on a respective outer side of the working space.

The advantage of this feature is that the roller itself can be stationary, so that only the roller-shade web itself is displaced. This helps further reduce the mass to be moved upon displacement of the spindle head.

It is further preferred if the spindle head is surrounded by a box, attached to the second carriage, from which the spindle head can be at least partly extended downward, and which is displaceable between the cheekpieces into the working space in the movement direction of the second carriage.

This feature is advantageous in terms of design: arranged on the first carriage are, for example, two vertical cheekpieces between which the box runs forward and back in the Y direction. The two roller-shade covers, which correspondingly wind up and unwind as the carriage is displaced in the X direction, are provided on both sides of the cheekpieces, which travel in the X direction along with the X carriage. Upon displacement of the spindle head in the Y direction, however, the roller-shade covers remain unaffected; instead, the box runs through between the two cheekpieces.

It is preferred in this context if the cheekpieces each have a wiper which rests against the moving box.

The advantage here is that good sealing of the working space is achieved in this region as well, even though for the reasons mentioned above, lesser demands are to be placed on sealing quality in this region.

It is further preferred if the cheekpieces as well as the roller-shade surfaces extend obliquely upward and to the front, so that the roller-shade covers cover the working space obliquely upward and to the rear.

The advantage here is that with this tilted arrangement of the roller-shade covers, the top cover is implemented, so to speak, at the same time. This feature thus offers design advantages, since no measures need to be taken for sealing between a top cover and a cover of the rear wall effected by the roller-shade covers.

It is preferred in this context if a roller of a further roller-shade cover, which is guided with its free end on the box and with its roller-shade surface provides sealing of the working space above the box, is arranged between the cheekpieces at their front upper ends.

The advantage here is that the "top gap" between the cheekpieces and above the box does not need to be sealed with panels or similar parts, but rather that a window blind can also be provided for this purpose, so that the box can overall be designed to have less height, i.e. has a lower weight. This feature thus also helps to reduce the moving masses, so the spindle head can be displaced more quickly.

It is preferred in this context if the free end of the further roller-shade cover is attached to a wiper bar which is mounted on the box in vertically displaceable fashion and is guided on the cheekpieces displaceably in their longitudinal direction.

The advantage here is that the inclination of the roller-shade surface of the upper roller-shade cover does not change when the box is displaced in the Y direction. When the box is, for example, displaced toward the front between the cheekpieces, the wiper bar on the box thus shifts upward, because it must follow the oblique upward profile of the cheekpieces. When the box moves back, the wiper bar is pulled back down because it is guided simultaneously on the cheekpieces and on the box, thereby wiping the front side of the box and thus removing adhering chips from it.

A further advantage of this arrangement is the fact that the upper roller-shade cover can laterally overlap the cheekpieces but is in contact with them, thus providing even better covering of the working space in this region.

It is preferred in this context if the wiper bar is attached to two slide blocks which are each mounted in a vertical groove on the box and each have an oblique slot into which engages a wiper bar which is attached, preferably laterally adjustably, to the respective cheekpiece.

The advantage here is that positive guidance of the wiper bar of the upper roller-shade cover can be implemented with a very simple design. The slide block is guided on the one hand in the vertical groove on the box, and on the other hand slides on the obliquely extending wiper bar. A further advantage of this design is that chips are, so to speak, automatically removed from the groove, since they are pushed out by the downward-traveling slide blocks as the box is pulled back between the cheekpieces.

It is preferred in general if the roller-shade covers wind onto the respective roller under spring tension, or if the rollers are drive-coupled to the associated carriage.

Winding of the roller-shade covers under spring tension, as known per se, has the advantage that this design is very simple to construct, while active "driving" of the roller-shade covers, for example by means of belt-type coupling to the associated carriage, ensures reliable winding and unwinding of the roller-shade covers.

It is further preferred if a tube, which surrounds the spindle head and upon displacement thereof into the working space shifts within a lower fitting opening in the box, is attached to the third carriage.

This feature is also of design-related advantage because it allows the spindle, and the tool changer surrounding it, to be protected from soiling in a simple fashion; said tube has a very low weight, so that this feature also contributes to an overall reduction in mass and thus to an increase in displacement velocity.

It is preferred in this context if a lower cover panel of the box, which extends to the rear between the cheekpieces beneath the first carriage, is provided.

The advantage here is that the "bottom gap" between the cheekpieces and beneath the box is also closed with a simple design. It would also be possible to arrange an additional roller-shade cover here, but since the box, because of the extensible tube, must in any case be closed off with a panel having an opening, in this case it is simpler in design terms to extend this panel farther rearward so that it covers the first carriage at the bottom toward the working space. A separate panel can also be used.

It is preferred in general if an enclosure is provided which seals the working space with respect to the machine tool and toward the outside, and has at least one lateral service door that is accessible from outside the working space.

The advantage here is that a sealed enclosure of very simple design can be implemented in the region of the working space, since now, in contrast to the related art, there is no further need for direct access from the working space out to the shifting mechanism. Instead, a service door can be provided for this purpose on the side of the machine tool.

It is further preferred in this context if the machine tool is displaceable on casters which are made inactive during operation of the machine tool, and if the machine tool stands on adjustable feet.

This feature makes it possible to arrange the new machine tool in a production line where multiple machine tools stand directly next to one another in a very confined space. The reason is that with such an arrangement of machine tools in a production line, it must nevertheless be possible to gain access to the machine mechanism at any time, which occurs as a rule via service openings in the working space. Said service openings in the working space entail, however, a whole series of sealing problems, which are eliminated by the fact that the service door is provided in a side wall. Because the machine tool is displaceable, maintenance on machine tools of this kind with a particularly well sealed working space is now possible, since the machine tool simply needs to be moved out of the line so the lateral service door becomes accessible.

This feature is thus, in the case of the generic machine tool mentioned at the outset, inventive and advantageous even considered per se; but this feature is particularly preferred in conjunction with the elevated X carriage, since here the lower weight of the upright and the further weight reductions associated with the aforementioned features facilitate displacement of the new machine tool.

It is preferred in this context if, for displacement of the machine tool, the casters are extended and the feet are retracted.

These features represent alternative design variants which ensure that during operation, the machine tool stands not on the rollers but on the adjustable feet, i.e. can be precisely aligned.

In the case of the new machine tool with the elevated X carriage and the lightweight roller-shade covers, it is thus particularly advantageous that only small masses need to be moved upon displacement of the spindle head, so that very high displacement velocities and accelerations can be achieved for the spindle head. This new machine concept also has, however, the further advantage that the working space can be sealed much more effectively and easily. This is due principally to the fact that fixed cover elements can be used in the lower region of the working space where the most intense soiling and greater mechanical stress on the enclosure occur, while the variable-length covers are needed only in the upper region of the working space, where the requirements in terms of load-bearing capacity and sealing of the covers are much less.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is depicted in the appended drawings and will be explained in more detail in the description below. In the drawings.

DETAILED DESCRIPTION OF A PREFERRED EMBODIMENT

Figure 1:
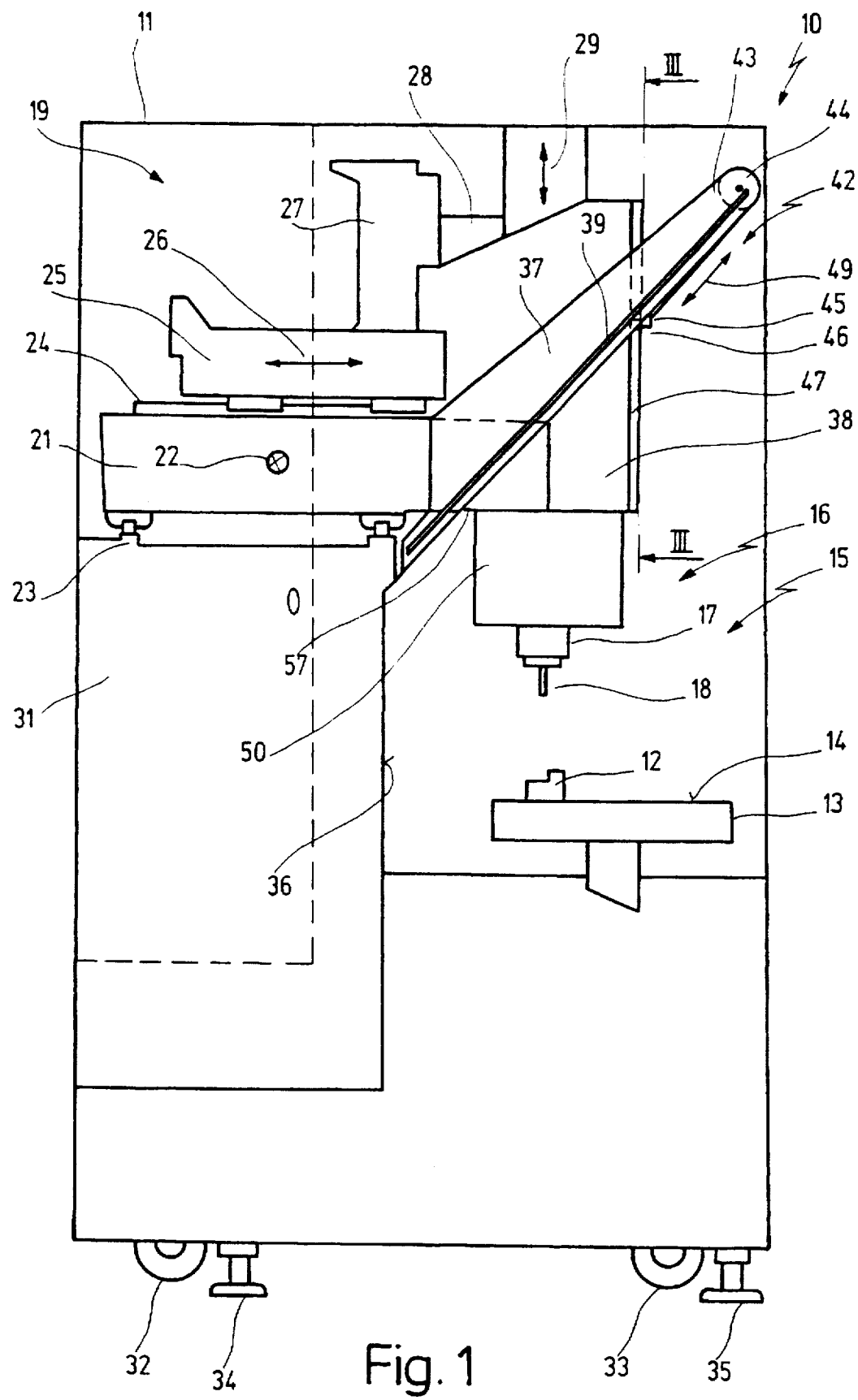
FIG. 1 shows a schematic side view of the new machine tool.

In FIG. 1, 10 designates a machine tool which has an enclosure 11. Machine tool 10 is used to machine workpieces 12 which are clamped on a workpiece table 13 which for that purpose has a clamping surface 14.

Machining of workpieces 12 takes place in a working space 15 in which a spindle head 16 is displaceable in three coordinate directions. Spindle head 16 has a spindle 17 which carries a schematically indicated tool 18 with which workpiece 12 is machined.

A shifting mechanism 19 arranged completely outside working space 15 is provided to displace spindle head 16.

Shifting mechanism 19 comprises a first carriage 21 which is displaceable, in the direction of an X coordinate indicated at 22, on guides 23 which are arranged behind working space 15 and well above clamping surface 14. Guides 23 are located so far above the usual working space 15 that spindle 17 with tool 18 operates, so to speak, in front of and below first carriage 21.

Guides 24 for a second carriage 25 which is displaceable along a Y coordinate, indicated at 26 and perpendicular to X coordinate 22, are provided on first carriage 21.

An upright 27, on which a third carriage 28 is displaceable in the direction of a Z coordinate indicated at 29, is arranged on second carriage 25. Spindle head 16 is attached to third carriage 28.

Spindle head 16 can consequently be displaced in working space 15, by means of shifting mechanism 19, in the three mutually orthogonal coordinates X, Y, and Z.

Also indicated schematically in FIG. 1 is the location of a service door 31 in enclosure 11, through which operating personnel can gain access from the side to shifting mechanism 19 and to other components of machine tool 10. To ensure that machine tool 10 can be arranged in a production line side by side with other machine tools and can nevertheless be easily serviced, it has casters 32, 33 by means of which it is displaceable. Arranged next to casters 32, 33 are feet 34, 35, which in the state shown in FIG. 1 project downward beyond casters 32, 33 so that machine tool 10 is stationary and can be aligned in terms of its position.

When machine tool 10 is to be displaced, feet 34, 35 are retracted and/or casters 32, 33 are extended.

Working space 15 is surrounded in its lower region by a fixed enclosure merely indicated at 36, which completely surrounds working space 15 in the lower region and prevents chips generated during the machining of workpieces 12 from emerging from working space 15 into the region of the machine mechanism.

Arranged in the upper region of working space 15, on the other hand, are variable-length covers which allow spindle head 16 to "dip" into working space 15, and allow displacement in the three orthogonal coordinate directions X, Y, and Z.

Two cheekpieces, of which only a left-hand cheekpiece 37 is visible in FIG. 1, are arranged for this purpose on first carriage 21. Cheekpiece 37 is a sheet-metal side element which extends from carriage 21 obliquely upward and to the right in FIG. 1.

Arranged between the cheekpieces is a box 38, made of sheet metal, which is attached to second carriage 25 and follows its movement in the direction of the Y coordinate.

A lateral roller-shade cover 39, of which only the attachment region of cheekpiece 37 is visible in FIG. 1, is provided on cheekpiece 37. A corresponding roller-shade cover, which is visible in FIG. 2, is provided on the other cheekpiece.

An upper roller-shade cover 42, which has a roller 44 at upper end 43 of cheekpiece 37, is also provided between the lateral roller-shade covers. Upper roller-shade cover 42 is attached with its lower free end 45 to a wiper bar 46 which is mounted on box 38 by means of a vertical groove 47, in a manner yet to be described. Wiper bar 46 is also mounted on cheekpiece 37, so that upon displacement of box 38 with respect to cheekpiece 37, it moves on the one hand up and down on box 38, and on the other hand along cheekpiece 37. Upper roller-shade cover 42 is thereby extended or retracted along an arrow 49, but its inclination does not thereby change.

A tube 50, which protects spindle 17 and the tool changers (not shown in FIG. 1) which are arranged around spindle 17, moves downward out of box 38.

Figure 2:
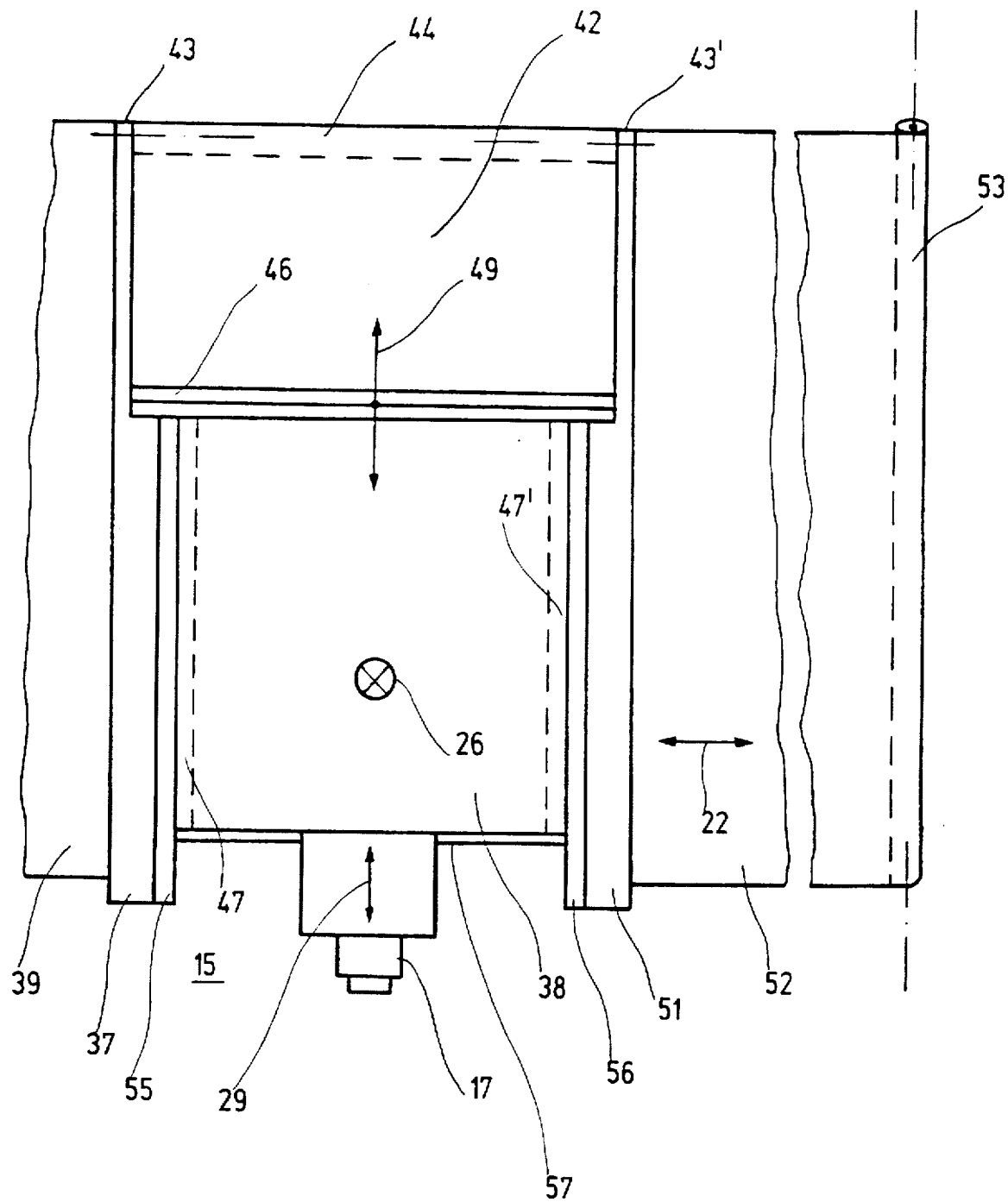
FIG. 2 shows a plan view of the working space of the machine tool of FIG. 1.

The arrangement of the individual roller-shade covers is more evident in FIG. 2, in a top view from the right in FIG. 1 of working space 15 of machine tool 10.

It is first of all evident in FIG. 2 that a further cheekpiece 51, on which is arranged a further lateral roller-shade cover 52 which can be wound onto a roller indicated at 53 and unwound therefrom, is arranged on the right side of box 38.

The roller provided for the left lateral roller-shade cover 39 is not shown in FIG. 2 for reasons of clarity.

FIG. 2 further indicates that roller 44 of upper roller-shade 42 is mounted rotatably between the two upper ends 43, 43' of cheekpieces 37 and 51. The width of roller-shade cover 42 is selected, in this context, so that it covers not only box 38 but also at least portions of cheekpieces 37, 51, against which it also almost rests.

Also provided between cheekpieces 37 and 51 and box 38 are wiper bars 55, 56 which provide a good seal between cheekpieces 37, 51 and box 38 in the region not protected by roller-shade cover 42.

A comparison between FIGS. 1 and 2 reveals that box 38 travels back and forth between the two cheekpieces 37, 51, the top gap between box 38 on the one hand and the two cheekpieces 37, 51 on the other hand being closed off by upper roller-shade cover 42. On either side of cheekpieces 37, 51, lateral roller-shade covers 39 and 52 provide sealing of working space 15 obliquely upward and to the left in FIG. 1.

Between the two cheekpieces 37 and 51 there is a further gap in the lower region that is closed off by a panel 57 which terminates box 38 at the bottom and extends rearward below first carriage 21. An opening, which is just large enough that tube 50 can be retracted and extended, is provided in said cover panel 57.

The design selections made in the region of the transition between cheekpieces 37, 51 and box 38 will now be explained with reference to FIGS. 3 and 4.

Figure 3:
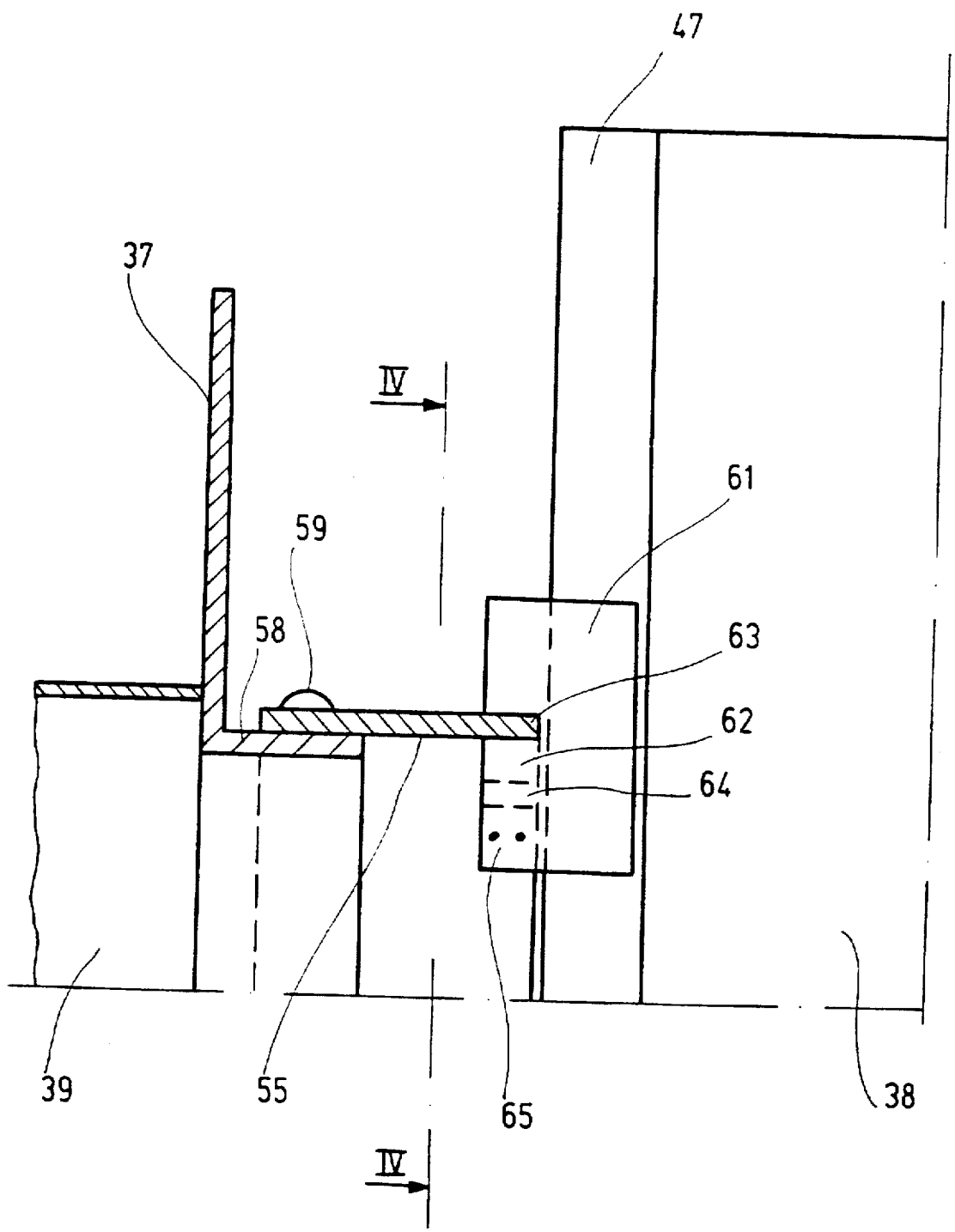
FIG. 3 shows a sectioned representation in the region of the box of the new machine tool, along line III—III of FIG. 1.

In FIG. 3, in a sectioned representation along line III—III of FIG. 1, it is first of all evident that cheekpiece 37 is L-shaped in cross section, and bears on its short arm 58 wiper bar 55, which is attached by means of a bolt 59 and is adjustable in terms of its spacing from box 38.

Mounted in vertically displaceable fashion in vertical groove 57 on box 38 is a slide block 61 in which an oblique slot 62, the upper opening 63 and lower opening 64 of which are indicated in FIG. 3, is provided. The free outer end of wiper bar 55 runs in said oblique slot 62.

Figure 4:
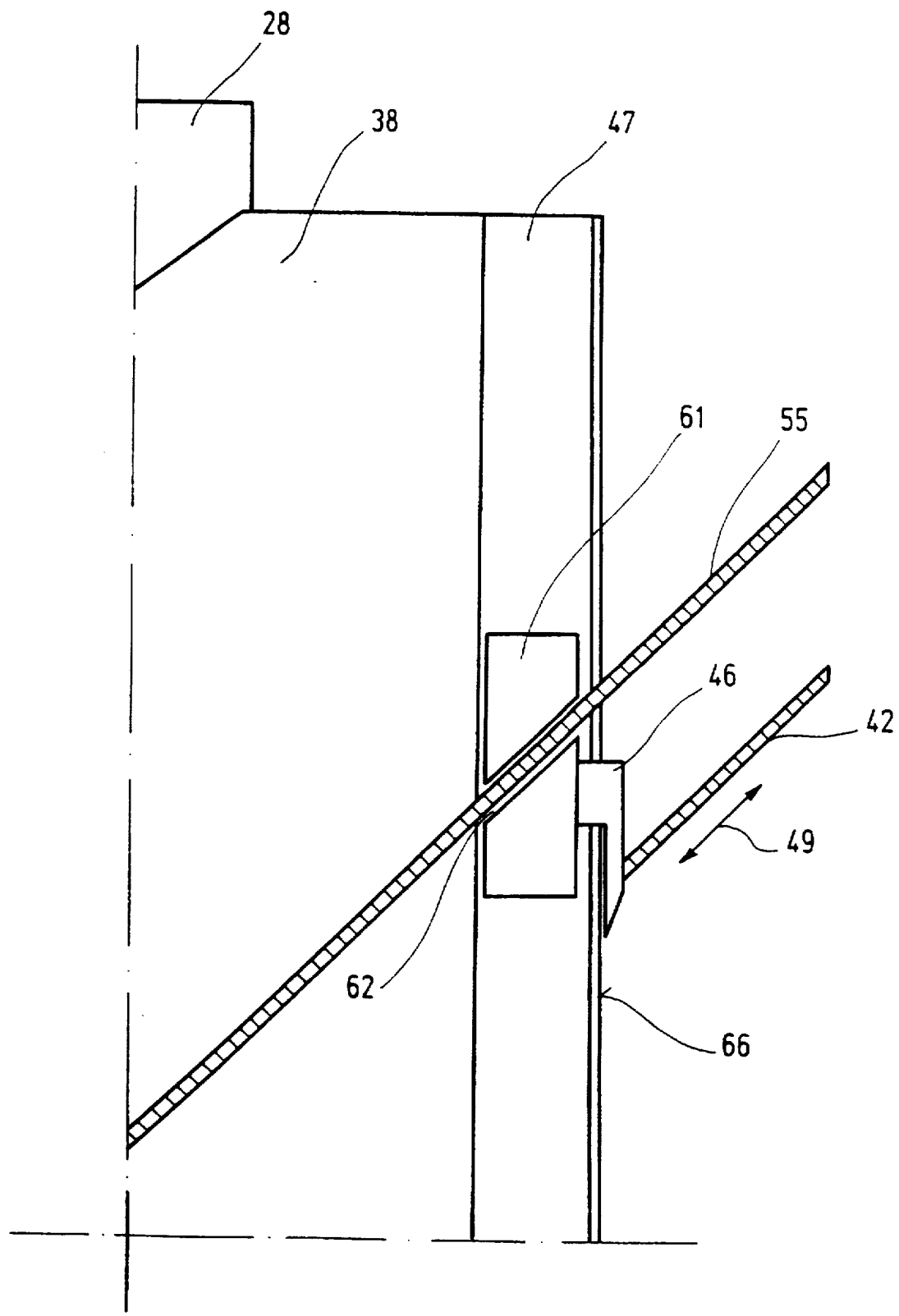
FIG. 4 shows a sectioned representation along line IV–IV of FIG. 3.

This arrangement is shown again in FIG. 4 as a section along line IV—IV of FIG. 3. This now also gives a better view of wiper bar 46, to which upper roller-shade cover 42 is attached. Said wiper bar 46 is attached to slide block 61 at attachment points shown schematically at 65 in FIG. 3, and rests against a front side 66 of box 38.

When box 38 is then shifted to the right in FIG. 4, slide block 61 slides upward and to the right on wiper bar 55, i.e. shifts upward in vertical groove 47. Roller-shade cover 42 is thereby wound up along arrow 49; the parallel orientation with respect to wiper bar 55 is maintained. The spacing between wiper bar 55 and the roller-shade surface is shown in exaggerated fashion here, but in practice the air gap is so small that chips cannot pass through.

When box 38 is moved to the left in FIG. 4, however, slide block 61 slides downward and to the left on wiper bar 55, i.e. downward in groove 47, carrying wiper bar 46 along so that roller-shade cover 42 is pulled out along arrow 49.

Of course a similar arrangement, with a slide block that is comparable but configured in mirror-image fashion, is arranged on the right side of box 38.

It should also be mentioned that slide blocks 61 are made of plastic, preferably of polyamide. In addition, wiper bars 55, 56 are also made of plastic, while wiper bar 46 is preferably bent to shape from sheet metal.

Therefore, what I claim is:

1. A machine tool comprising a workpiece table which has a clamping surface for workpieces to be machined; a shifting mechanism; a spindle head displaceable in a working space above the workpiece table relative thereto by means of said shifting mechanism and having a spindle receiving tools for machining the workpieces; said shifting mechanism including three carriages movable orthogonally to one another, of which the second carriage is mounted displaceably on the first, and the third carriage displaceably on the second carriage, the spindle head being joined to the third carriage, wherein the first carriage is arranged behind and above the working space, a roller-shade cover, which winds up and unwinds upon displacement of the first carriage and covers the working space with its roller-shade surface, is arranged on both sides of the first carriage, a cheekpiece extending to the upper end of the working space, on which the respective associated roller-shade cover is attached with its free end, is arranged on both sides of the first carriage, whereby the respective roller-shade cover is wound onto a roller arranged on a respective outer side of the working space, and the spindle head is surrounded by a box, attached to the second carriage, from which the spindle head can be at least partly extended downward, and which is displaceable between the cheekpieces into the working space in the movement direction of the second carriage.

2. A machine tool comprising a workpiece table which has a clamping surface for workpieces to be machined; a shifting mechanism; a spindle head displaceable in a working space above the workpiece table relative thereto by means of said shifting mechanism and having a spindle receiving tools for machining the workpieces; said shifting mechanism including three carriages movable orthogonally to one another, of which the second carriage is mounted displaceably on the first, and the third carriage displaceably on the second carriage, the spindle head being joined to the third carriage, wherein the first carriage is arranged behind the working space and above the clamping surface, a roller-shade cover, which winds up and unwinds upon displacement of the first carriage and covers the working space with its roller-shade surface, is arranged on both sides of the first carriage, a cheekpiece extending to the upper end of the working space, on which the respective associated roller-shade cover is attached with its free end, is arranged on both sides of the first carriage, whereby the respective roller-shade cover is wound onto a roller arranged on a respective outer side of the working space, and the spindle head is surrounded by a box, attached to the second carriage, from which the spindle head can be at least partly extended downward, and which is displaceable between the cheekpieces into the working space in the movement direction of the second carriage.

3. The machine tool of claim 2, wherein the cheekpieces each have an attachment member which rests against the moving box.

4. The machine tool of claim 2, wherein a roller of a further roller-shade cover, which is guided with its free end on the box and with its roller-shade surface provides sealing of the working space above the box, is arranged between the cheekpieces at their front upper end.

5. The machine tool of claim 4, wherein the free end of the further roller-shade cover is attached to an attachment bar which is mounted on the box in vertically displaceable fashion and is guided on the cheekpieces displaceably in their longitudinal direction.

6. The machine tool of claim 5, wherein the attachment bar is attached to two slide blocks which are each mounted in a vertical groove on the box and each have an oblique slot into which engages an attachment bar which is attached to the respective cheekpiece.

7. The machine tool of claim 2, wherein a tube, which surrounds the spindle head and upon displacement thereof shifts within a lower fitting opening in the box, is attached to the third carriage.

8. The machine tool of claim 7, wherein a lower cover panel of the box, which extends to the rear between the cheek-pieces beneath the first carriage, is provided.

9. A machine tool comprising a workpiece table which has a clamping surface for workpieces to be machined; a shifting mechanism; a spindle head displaceable in a working space above the workpiece table relative thereto by means of said shifting mechanism and having a spindle receiving tools for machining the workpieces; said shifting mechanism including three carriages movable orthogonally to one another, of which the second carriage is mounted displaceably on the first, and the third carriage displaceably on the second carriage, the spindle head being joined to the third carriage, wherein the first carriage is arranged behind the working space and above the clamping surface, a roller-shade cover, which winds up and unwinds upon displacement of the first carriage and covers the working space with its roller-shade surface, is arranged on both sides of the first carriage, a cheekpiece extending to the upper end of the working space, on which the respective associated roller-shade cover is attached with its free end, is arranged on both sides of the first carriage, whereby the respective roller-shade cover is wound onto a roller arranged on a respective outer side of the working space, and the cheekpieces as well as the roller-shade surfaces extend obliquely upward and to the front, so that the roller-shade covers cover the working space.

* * * * *